United States Patent [19]
Leblanc

[11] 3,923,384
[45] Dec. 2, 1975

[54] SELF ADJUSTING SPECTACLE FRAME ASSEMBLY

[75] Inventor: Conrad L. Leblanc, Leominster, Mass.

[73] Assignee: Foster Grant Co., Inc., Leominster, Mass.

[22] Filed: Oct. 3, 1974

[21] Appl. No.: 511,824

[52] U.S. Cl. .............. 351/113; 16/128 A; 351/121; 351/153
[51] Int. Cl.² ....................... G02C 5/16; G02C 5/22
[58] Field of Search....... 351/113, 121, 153; 2/14 T; 16/128 A

[56] References Cited
UNITED STATES PATENTS
2,550,348  4/1951  Hansen .................................. 351/113
2,608,905  9/1952  Nelson.............................. 351/121 X FOREIGN PATENTS OR APPLICATIONS
349,425  11/1960  Switzerland......................... 351/113

Primary Examiner—Paul A. Sacher
Attorney, Agent, or Firm—Michael J. Tully

[57] ABSTRACT

A spectacle assembly which automatically provides sufficient temple pressure to insure a snug fit on the head of the wearer is provided. The assembly includes a leaf spring pressure means attached to the temple of the spectacle which means is adapted to coact with the corner portion of the spectacle front frame member such that the spring is compressed substantially along its longitudinal axis after the leading edge of the spring contacts the front frame corner portions as the temple members are pivoted towards the open position.

3 Claims, 7 Drawing Figures

SELF ADJUSTING SPECTACLE FRAME ASSEMBLY

BACKGROUND OF THE INVENTION

The present invention is directed towards a spectacle frame assembly which automatically provides a suitable amount of temple pressure on the head of the wearer to provide a comfortable fit for a variety of head sizes.

The classical contruction of spectacle frames includes a front frame member adapted to retain a pair of optical or tinted lenses in a plane intersecting the line of vision of the wearer. At the lateral or outer sides of this front frame member are corner portions for connecting temple members or elongated arms which serve to hold the spectacle frame on a wearer's head by engagement with the side or ear portions of the head. These temple members are normally pivotally movable from positions in which they are folded in an overlying arrangement at the back or eye side of the spectacle front frame member to positions in which they extend rearward from the front frame member to be properly engageable with the sides of a wearer's head.

The temple members are normally connected to the corner portions of the front frame member by a hinge mechanism which permits pivotal movement of the temples over an arc of about 90° or less. Often the present arc angle of the rearwardly extending temple portions is not entirely suited for a particular wearer's head size and adjustment may be necessary to either lessen the tension on the head or increase the tension to prevent slippage of the frames along the nose of the user and displacement of the spectacles as the result of quick head moves.

Attempts have been made in the prior art to incorporate into spectacles a mechanism for exerting a moderate amount of pressure on the temples of the spectacle so as to urge the temples against the head of the user. Many of the prior art mechanisms are based on spring members disposed to act upon the temple and frame portions of spectacles so as to bias the temples toward a closed position thereby affording a snug fit. Many of these spring members operate on the principle of the application of a force at the extremities of a flat leaf spring in a direction substantially normal to the longitudinal flat surface of the spring to deform the spring into a stressed condition. For example, U.S. Pat. Nos. 2,029,723 and 2,550,348 disclose leaf springs mounted on the foreward portion of spectacle temples and adapted to laterally contact a portion of the spectacle frame as the temples are extended toward the open position. The lateral force stresses these springs thereby tending to urge the temples back towards the closed position. U.S. Pat. Nos. 3,145,254, 3,619,043 and 3,654,376 disclose different variations of a similar concept whereby flat springs are subjected to lateral forces. One distinct disadvantage of some of these visible mechanisms is that they may detract from the outward appearance of the spectacles or potentially may catch in the hair of the wearer. In addition, since most spring mechanisms are designed to operate at the hinge area of the spectacles, the springs must be relatively small in size if they are to be concealed. Continuous lateral deformation of a relatively small area of spring surface such as the tip or center portion of a steel spring will result in a lowering of stress or spring resiliency more quickly than if a larger area of the same spring were subjected to the same deformation forces.

Accordingly, it is an object of this invention to provide a spectacle assembly which automatically adjusts to many different head sizes.

Another object of the preferred embodiment is to provide a self-adjusting spectacle assembly wherein the pressure adjusting means is substantially not visible at the external surfaces of said spectacle assembly.

Another object of the preferred embodiment is to provide a self-adjusting spectacle assembly having a pressure means for increasing the frictional forces at the hinge means connecting the temple members to the front frame member.

Still other objects are to provide a self-adjusting spectacle assembly which is inexpensive, simple in design and of improved appearance and durability.

SUMMARY OF THE INVENTION

Pursuant to the above and other objects, the present invention provides a novel self-adjusting spectacle assembly including a leaf spring pressure means rigidly attached to the temple member of the spectacle and adapted to coact with the corner portions of the front frame member of the spectacle such that the leaf spring is compressed when the leading edge of the spring contacts the frame corner portions as the temple members are pivoted towards the open position. Compression of the leaf spring along its free longitudinal length imparts a tension to each of the temple members biasing these members inward towards the closed position. In a preferred embodiment, the leaf spring pressure means is mounted on the interior surfaces of each of the temple members and bowed inwardly in a prestressed condition with the forward portion of the spring biased for sliding pressure contact with that portion of the hinge means integral with the front frame member. The leading edge of the spring means projects for compressive contact with the corner portions of the front frame member at a point external to the hinge means at the lateral ends of the spectacle front frame assembly.

DESCRIPTION OF THE INVENTION

Figure 1:
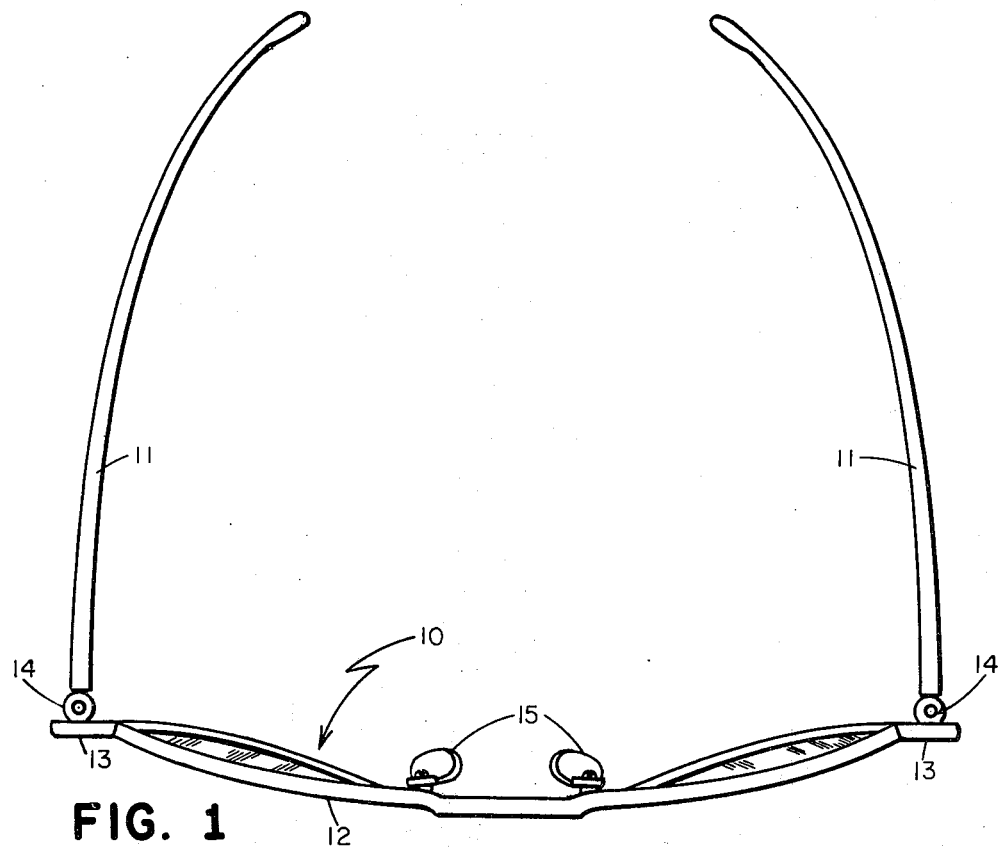
FIG. 1 is a top plan view illustrating generally the classical construction of a spectacle assembly as is known in the art.

Referring now to FIG. 1, the classical construction of a spectacle assembly as is known in the art is shown at 10. The construction includes a pair of temple members 11 pivotally mounted to front frame and lens retaining member 12 at corner portions 13 which are generally integral with frame member 12 at the lateral ends thereof. Also shown are a pair of hinge means 14 which serve to pivotally connect temple members 11 to corner portions 13. As is general in the art, the front frame assembly also includes a nose bridge portion 15 which facilitates the wearing of the spectacles. The precise construction of FIG. 1 does not represent this invention but is presented merely to illustrate a typical spectacle assembly.

Figure 2A:
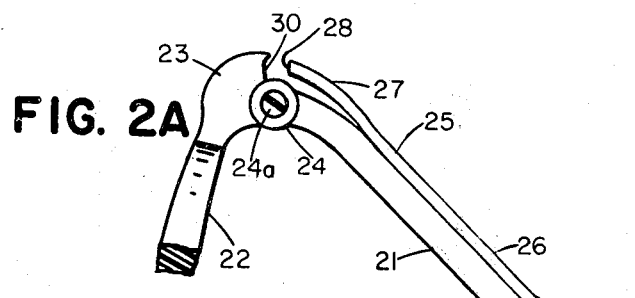
FIGS. 2A and 2B are top fragmentary views of one embodiment of the invention showing the spectacle hinge area and spring means in a relaxed and stressed condition respectively.
Figure 2B:
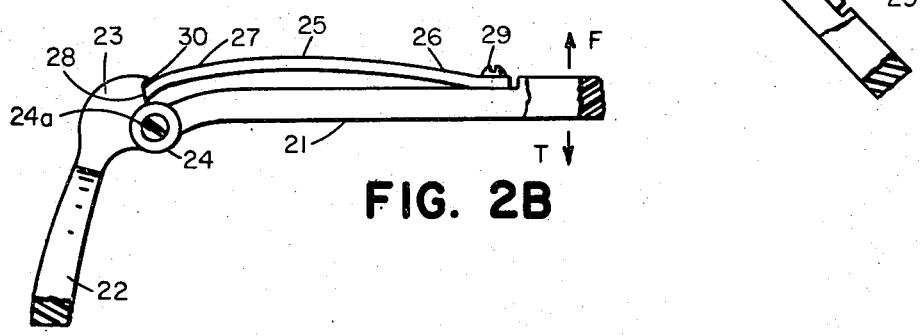
Figure 2C:
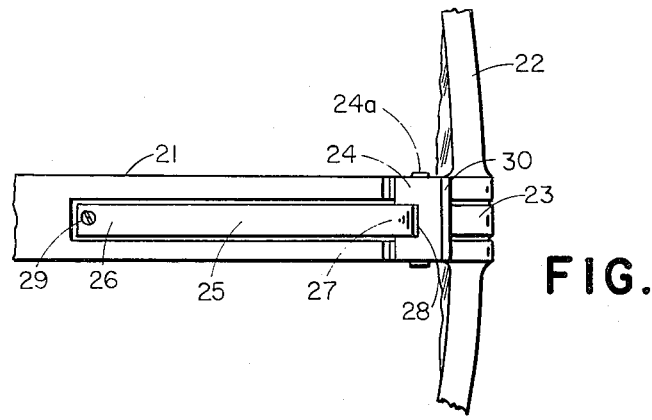
FIG. 2C is an outside plan view of FIG. 2A.

FIGS. 2A, 2B and 2C illustrate one embodiment of the present invention wherein the temple tensioning means is mounted at the external foreward portion of the spectacle temple. Reference numeral 22 indicates a section of front frame member with which frame corner portion 23 is integral. Corner portion 23 terminates in rearwardly disposed abutment portion 30 which is of a size and shape to appropriately engage and seat projecting foreward edge 28 of leaf spring member 25 when the latter is advanced for mutual contact by pivoting temple 21 at hinge 24 around hinge pin 24A. Leaf spring member 25 is a unitary leaf spring having a foreward portion 27, a rearward portion 26 and a foreward edge 28. Leaf spring 25 is rigidly fixed preferably near its rearward extremity to temple member 21 by rivet 29.

The term leaf spring as used herein is intended to encompass a substantially flat unitary, rectangular shaped strip of a highly resilient metal such as tempered steel or beryllium. Generally, tempered steel having a Rockwell hardness of about 63, a tensile strength of about 95,000 to 100,000 psi, and an unstrained length of about ¾ inch has been found suitable for the purposes of the present invention. The spring may be mounted by providing a hole in its rearward portion and riveting or otherwise rigidly fixing it to the temple member. Preferably, a portion of the external surface of the temple member where the leaf spring is mounted is molded with a groove to seat the spring such that it will be flush with the external temple surface. The spring should be pre-stressed or otherwise mounted such that it will distort outwardly from the temple surface when subjected to compressive longitudinal forces at its foreward and rearward portions.

The mechanism by which the spring member is caused to exert inward pressure on the temples is illustrated in FIG. 2B. As force F is applied by pivoting the temple member towards the open position, leading edge 28 of spring member 25 contacts abutment portion 30. As additional force is applied, the spring member is subjected to compressive forces applied substantially parallel to the longitudinal axis of the spring, placing the spring under strain between leading edge 28 and rivet point 29. The stress or restoring force of the spring results in tension force T on the temple member 21.

Figure 3A:
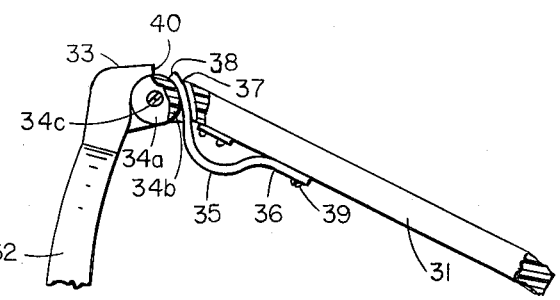
FIGS. 3A and 3B are top fragmentary partial section views of another embodiment of the invention showing the spectacle hinge area and hidden pressure spring means in a relaxed and stressed condition respectively.
Figure 3B:
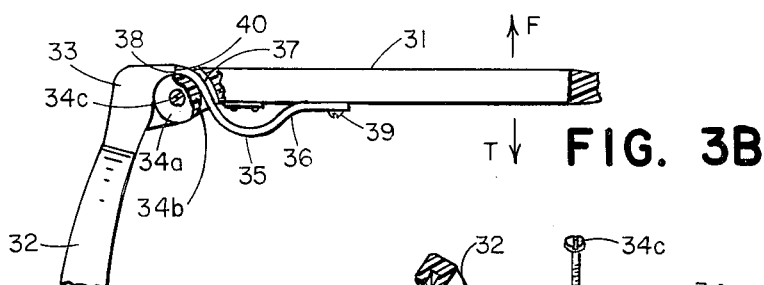
Figure 3C:
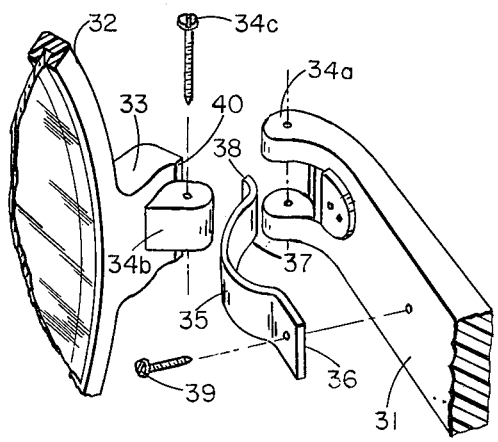
FIG. 3C is a fragmentary expanded perspective view of the embodiment of FIGS. 3A and 3B showing the pressure spring means and spectacle hinge means.

Another embodiment of the temple tensioning means of this invention is shown by FIGS. 3A, 3B and 3C, wherein the temple tensioning means is mounted on the internal foreward portion of the spectacle temple. Reference numeral 32 indicates a section of front frame member with which frame corner portion 33 is integral. Corner portion 33 terminates in rearwardly disposed abutment portion 40 which is positioned for abutting contact with foreward edge 38 of leaf spring member 35 when the latter is advanced for mutual contact by pivoting temple member 31 around the hinge assembly which consists of temple barrel 34a, corner portion barrel 34b and pin 34c. Leaf spring member 35 is a unitary flat spring which has been pre-stressed such as to form a fairly flat U or bow shape and so mounted that the apex of the bow is disposed inwardly. Leaf spring 35 has a foreward portion 37, a rearward portion 36 and a foreward edge 38. The spring is rigidly mounted to the inner surface of temple member 31 by rivet 39.

FIG. 3C illustrates the detail of the hinge mechanism which may be referred to as a "barrel type" of hinge. The outer forked barrel component 34a of the hinge is integral with temple 31 while the inner barrel portion 34b is integral with corner portion 33 of front frame member 32. The outer hinge component preferably consists of two outstanding rounded leg members in a "horseshoe" shape adapted to fit over inner barrel component 34b and adapted to be connected thereto by hinge pins 34c, through centrally drilled holes. The temple is assembled to the corner portion such that foreward portion 37 of leaf spring 35 is biased against inner hinge portion 34b. Thus, foreward spring portion 37 may slidingly and biasingly engage inner hinge portion 34b as temple member 31 is pivoted back and forth around pivot pin 34c. This provides for increased friction at the hinge assembly giving the temples a tighter and more rigid feel as they are folded or opened.

The mechanism by which the spring member exerts inward pressure on the temples is similar to that involved in the previous embodiment and illustrated by FIG. 3B. As force F is applied by pivoting the temple members towards the open position, leading edge 38 of spring member 35 contacts abutment portion 40. As additional force is applied, the spring member is subjected primarily to compressive forces applied substantially parallel to the longitudinal axis of the spring member at its foreward edge and rearward portion, thereby placing the spring under strain. This is reflected by an increase in the bow shape of the spring inasmuch as the strain is distributed substantially over the entire length of the spring between leading edge 38 and rivet point 39. The stress or restoring force of the spring results in a tension force T on the temple members urging them toward a closed position with respect to front frame member 32.

The mechanics of all embodiments of the spectacle assembly of the present invention requires that the leading edge of the spring pressure means contact the abutment portion at a point external to the hinge means connecting the temples to the front frame member. Thus, although the spring means may be mounted to either the external or internal surface of the temple members, the leading edge of the spring means should be disposed outside or external to the hinges, i.e., on the side of the hinges opposite the geometric center of gravity of the spectacles.

What I claim is:

1. A spectacle assembly comprising:
   a. a front frame member for retaining a pair of lenses in a plane intersecting the line of vision of the wearer;
   b. corner portions integral with said frame member at the lateral ends thereof, said corner portions including a rearwardly disposed abutment portion;
   c. a pair of temple members, one pivotally mounted on each of said corner portions and extending rearwardly therefrom;
   d. a pair of resilient leaf spring members, one mounted longitudinally on the foreward portion of each of said temple members, said spring members having a rearward portion, a foreward portion, and a foreward edge, the rearward portion of said spring members being rigidly fixed to the interior surfaces of said temple members and the foreward portion being unattached to said temple members, the foreward edge of said spring members positioned for abutting contact with the abutment portion of said frame corner portions;

e. hinge means for connecting said temple members to each of said corner portions and for pivotally positioning the foreward edges of said spring members into and out of contact with the abutment portion of said frame corner portions, the foreward edge of each of said spring members being disposed external and lateral to said hinge means whereby said leaf spring members are compressed along their free length by abutting pressure contact with said abutment portion when said temple members are pivoted toward the open position urging said temple members toward a closed position with respect to the spectacle front frame member.

2. The spectacle assembly of claim 1 wherein said hinge means comprises an inner barrel component integral with said corner portions and an outer forked barrel component integral with said temples.

3. The spectacle assembly of claim 2 wherein the resilient spring members are prestressed in an inwardly bowed shape, the foreward portion of said spring members being biased for sliding contact with the inner barrel component of said hinge means.

* * * * *